No. 844,932. PATENTED FEB. 19, 1907.
J. H. GROOTERS.
SEED DROPPER.
APPLICATION FILED DEC. 1, 1906.

Witnesses
Frank Hough
C. C. Hines.

Inventor
John H. Grooters,
By Victor J. Evans
Attorney

UNITED STATES PATENT OFFICE.

JOHN H. GROOTERS, OF ALLENDORF, IOWA.

SEED-DROPPER.

No. 844,932.     Specification of Letters Patent.     Patented Feb. 19, 1907.

Application filed December 1, 1906. Serial No. 345,878.

*To all whom it may concern:*

Be it known that I, JOHN H. GROOTERS, a citizen of the United States of America, residing at Allendorf, in the county of Osceola and State of Iowa, have invented new and useful Improvements in Seed-Droppers, of which the following is a specification.

This invention relates to seed-droppers, and particularly to droppers of that type designed for planting corn and in which the corn-hopper is provided in its bottom with a rotary seed-ring or dropper-plate, which receives the kernels from the superposed body of seeds and delivers the same through the discharge-opening into the seed tube or conduit. Heretofore seed-droppers of this type have operated on two principles, the seed in one being received flatwise into the pockets of the seed-ring, the number of grains entering each pocket being controlled by the action of a cut-off. Owing to the fact that the kernels vary materially in width and thickness, seed-droppers of this type are not uniform in action, as, on account of the varying size of the kernels it, frequently happens that the pockets receive more than a single kernel, or none at all, thus preventing the discharge of a like number of kernels upon each dropping action of the seed-plate. In the other type of droppers the kernels enter the pockets edgewise, which to a certain extent overcomes the objection to the first-named type of dropper on account of the greater uniformity in the thickness of the kernels than in their other dimensions, resulting in the more certain feed of the grain to the pockets; but this type of dropper is also objectionable on account of the precision with which the kernels must be turned to present them edgewise to the pockets, a difficulty which frequently causes sticking, although to a less extent than with seed-droppers of the flat-feed type.

The object of the present invention is to provide a seed-dropper in which these objections are effectually overcome by constructing and arranging the parts of the dropper to cause the kernels to enter the pockets on a feed-line tangential to the edge of the dropper-plate, the kernels feeding in their passage to the pockets neither flatwise or edgewise, but at an angle substantially intermediate the same, thus causing them to slide freely into the pockets with much greater certainty and uniformity.

Figure 1:
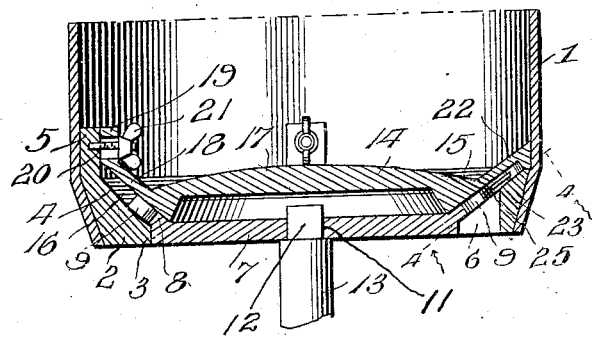
Figure 3:
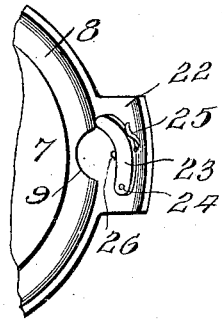
Figure 4:
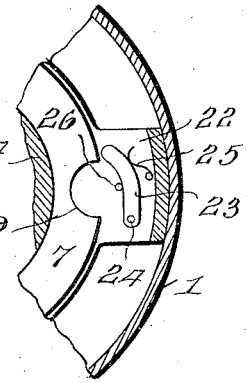
Figure 2:
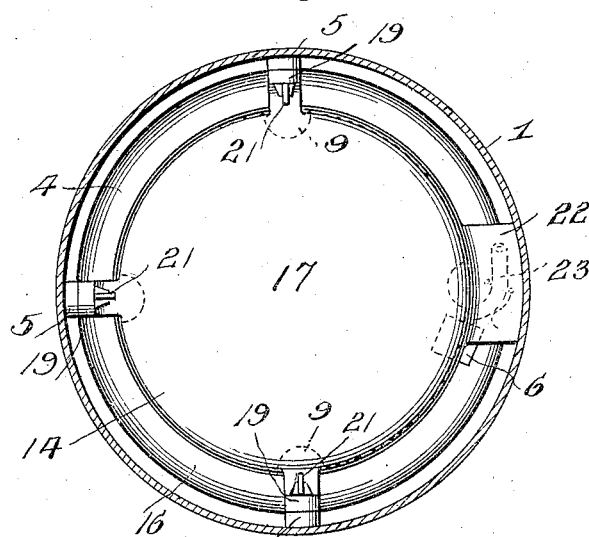

In the accompanying drawings, Figure 1 is a central vertical section of a seed-dropper embodying my invention. Fig. 2 is a horizontal section through the hopper looking down upon the dropping mechanism. Fig. 3 is a fragmentary sectional plan view with the seed-ring removed, showing the cut-off. Fig. 4 is a section on line 4 4 of Fig. 1 looking upward toward the cut-off, as indicated by the arrows.

Referring to the drawings, 1 designates the corn-hopper, having a bottom plate 2, said plate being provided with a central circular opening 3 and being secured in position in any preferred manner. Said plate is provided with a sloping upper surface 4, inclining inwardly and downwardly from its upper peripheral edge to the wall of the opening 3, and at regular intervals around the periphery of the plate are provided upstanding lugs 5. A discharge-opening 6 opens at one point through the sloping face 4 and leads downward through the bottom of the plate and is designed to deliver the feed into the seed tube or conduit. (Not shown.)

The rotary seed ring or plate 7 fits and turns within the opening 3 and is provided with flat upper and lower surfaces and is formed at its outer edge with a peripheral flange 8, partially cut away at intervals to provide a suitable number of seed pockets or passages 9. In the form shown the flange 8 extends at an oblique angle to the body of the ring or plate or inclines outwardly and upwardly from the upper edge of the periphery thereof, the lower surface of the flange having a slope or inclination corresponding to that of the surface 4, over upon which it extends and rides, while the upper surface of the flange inclines in like manner to extend in a plane parallel with said lower surface. The outer or peripheral edge of the flange 8 terminates about midway of the height of the surface 4, which latter acts as an inclined guide, down which the kernels slide and are conducted into the pockets 9. The central portion of the body of the seed ring or plate is formed with an angular opening 11 to receive the upper angular end 12 of an operating-shaft 13, driven in any suitable manner from the driving mechanism of the planter.

Arranged above the seed-plate is a cap or cover plate 14, corresponding substantially in dimensions to the seed-plate. This cap or cover plate is formed with a peripheral flange 15, whose outer surface slopes or inclines at an angle parallel with and corresponding to the angle of inclination of the surface 4 and upper surface of the flange of the dropper. The lower edge of the said sloping outer face of the cap or cover plate rides in contact with the upper inclined surface of the flange of the seed-plate and holds the latter from upward movement, the seed-plate being held against lateral movement by its bearing against the wall of the opening 3. Beyond the flange 8 the inclined face of the flange 15 projects to a sufficient extent to extend partly over the surface 4, thus providing a guard-rim to prevent the kernels from partially entering the pockets through a vertical feed, and thence causing the seed-ring to choke. As a result of this construction and arrangement of the inclined faces of the several parts a narrow feed-channel 16 is formed between the surface 4 and lower face of the flange 15, through which the kernels feed to the pockets or passages 9.

The cap or cover plate is provided with a convex upper surface 17, which slopes on all sides from the center to the outer edge thereof to cause the seed to freely feed thereover onto the upwardly-projecting portion of the surface 4. Lugs 18 project obliquely beyond the flange 15 and have slotted upright extensions 19, receiving threaded pins or bolts 20, projecting horizontally from the lugs 5, which pins carry nuts 21 to clamp the lugs 18 against the lugs 5, thus supporting the cap-plate firmly in position. The slots in the extensions 19 permit the cap-plate to be vertically adjusted with relation to the seed-ring, so that seed-rings with pocketed flanges varying in thickness for dropping different-sized kernels may be inserted in position between said cap-plate and the hopper-bottom 2. This feature of adjustability of the cap-plate is advantageous, but not absolutely essential, as in lieu thereof cap-plates having flanges 15, varying in thickness, may be employed to regulate the space between the same and the surface 4 for the reception and use of seed-plates having pocketed flanges of different thicknesses.

Above the discharge-opening 6 the cap-plate 14 is provided with a supporting extension shield or hood 22, on the under side of which is arranged a curved cut-off finger 23. This finger is pivoted at one end, as indicated at 24, to the shield 22, with its hook-shaped free end arranged to ride in contact with the rim edge of flange 8 of the seed-plate 7, against which it is pressed by the action of a spring 25. The bottom of the finger rests upon the adjacent portion of the inclined face 4 of the bottom plate 2, and thus the finger forms a barrier in the channel 16 to remove any surplus or extra kernels which may be carried toward the discharge-opening with the kernel which is occupying a cell, so as to prevent more than one kernel being carried by each cell. The nose or point of the finger is prevented from entering the cells and dislodging the kernels therefrom by a stop-pin 26. The finger is adapted to tilt outwardly on its pivot or away from the pocket against the resistance of the spring when coming in contact with a kernel of abnormal size, which projects beyond the pocket, thus preventing the kernel from being crushed or swept out of the pocket.

It will be observed from the foregoing description that the channel 16 as constructed and arranged extends tangentially to the periphery of the seed-ring, so that the kernels feed to the pockets on a corresponding line and that each pocket is provided with side walls and is closed by top and bottom walls formed by the surface 4 and flange 15, except at the outer side, where the said pocket is open for the feed of the kernel thereinto. On their passage to the pockets the kernels drop onto the inclined surface 4 and are thereby turned to lie at an angle to the horizontal and slide down said surface into engagement with the inclined face of the flange 15, which guides them thereinto. Thus one of the sides of the kernel will lie in contact with the surface 4 and the other or upper side thereof in contact with the inclined face of the flange 15, so that the kernels will pass edgewise into the pockets on a feed motion inwardly toward the periphery of the seed-ring and will thereby move easily and freely into the pockets. This mode of positioning and feeding the kernels is one that is easily accomplished through the described construction and secures greater certainty and uniformity in the supply of the seed to the pockets, since such a feeding action possesses all of the advantages of a vertical edgewise feed without being subject to the disadvantages thereof, owing to the fact that less precision of action is required in turning the seed for entry into the pockets, as the seed do not tend to tilt out of feeding position, as is the case with the vertical edgewise feed.

While the pocketed flange of the feed-ring and the inclined channel-forming surfaces cooperating therewith are shown as arranged obliquely to the plane of motion of the seed-ring, it will of course be understood that such parts may be disposed at any desired angle between the vertical and horizontal so long as the principle of operation is preserved without departing from the spirit of the invention and that such other changes in the construction and arrangement of the parts may be adopted as clearly fall within the scope of the appended claims.

Having thus described the invention, what is claimed as new is—

1. In a seed-dropper, a hopper-bottom having a feed-chamber having oblique sides, the bottom side extending outwardly beyond the other, and a rotary seed-plate provided with seed-pockets arranged obliquely thereto and disposed within said channel.

2. A seed-dropper comprising a hopper, a rotary seed-plate provided with peripheral pockets arranged obliquely to its plane of rotation, and means within the hopper forming an oblique channel leading to said pockets, for the inward edgewise feed of the seed at an angle between the vertical and horizontal.

3. A seed-dropper comprising a hopper, a rotary seed-plate therein provided with peripheral pockets arranged at an angle to its plane of rotation, and means within the hopper forming a correspondingly-arranged channel, said channel having one of its walls extending beyond the pockets to form a bottom guiding-surface for the inward edgewise feed of the seed at an angle to the horizontal.

4. A seed-dropper comprising a hopper, a rotary seed-plate therein provided with a flange inclining upwardly and outwardly and formed with feed-pockets, and means within the hopper for conducting the seed edgewise tangentially into said pocket.

5. A seed-dropper comprising a hopper, a rotary seed-plate therein provided with seed-pockets disposed at an upward and outward angle thereto, and means within the hopper for guiding and conducting the seed at an inward and downward angle into said pockets.

6. A seed-dropper comprising a hopper, a rotary seed-plate therein provided with pockets inclined upwardly and outwardly to its plane of rotation, and means within the hopper forming a feed-channel communicating with the pockets, said channel having guiding-surfaces corresponding in inclination to the pockets with respect to the plane of rotation of the seed-plate for conducting the seed edgewise at an inward and downward angle into said pockets.

7. A seed-dropper comprising a hopper, a rotary seed-plate therein provided with an inclined flange arranged at an upward and outward angle thereto and formed with seed-pockets opening through the outer edge thereof, and means within the hopper having guiding-surfaces forming a channel leading to said pockets to conduct the seed edgewise thereto at an angle to the horizontal, one of said guiding-surfaces forming an extended support sloping inwardly from the wall of the hopper.

8. A seed-dropper comprising a hopper having a bottom formed with an opening and a sloping surface leading thereto, a cap supported above said bottom and having an inclined surface parallel with said sloping surface to provide an intervening channel lying obliquely to the plane of rotation of the plate, and a rotary seed-plate turning in said opening and provided with an oblique peripheral flange moving between said sloping and inclined surfaces and provided with pockets opening through the outer edge thereof.

9. A seed-dropper comprising a hopper having a bottom provided with an opening and a sloping surface inclining downwardly and inwardly to said opening, a cap or cover plate arranged above the opening in the hopper and having an inclined surface lying parallel with the lower portion of said sloping surface, said cap being also provided with an upper face inclining in all directions toward the outer edge thereof, and a feed-plate arranged to rotate in said opening and provided with a peripheral flange inclining therefrom at an oblique angle, said flange being arranged between said sloping and inclined surfaces and provided with pockets opening through the outer edge thereof.

10. A seed-dropper comprising a hopper having a bottom formed with an opening and a sloping surface leading thereto, a cap supported above said bottom and having an inclined surface parallel with said sloping surface to provide an intervening channel lying obliquely to the plane of rotation of the plate, a rotary seed-plate turning in said opening and provided with an oblique peripheral flange moving between said sloping and inclined surfaces and provided with pockets opening through the outer edge thereof, a pivoted, spring-pressed cut-off finger supported in position to remove any excess seed from the pockets, and means for limiting the inward movement of said finger.

In testimony whereof I affix my signature in presence of two witnesses.

JOHN H. GROOTERS.

Witnesses:
   C. R. YOUNG,
   E. C. UPP.